United States Patent
Saha et al.

(10) Patent No.: US 11,520,682 B2
(45) Date of Patent: Dec. 6, 2022

(54) CODE COVERAGE METHOD FOR EMBEDDED SYSTEM ON CHIP

(71) Applicant: SAMSUNG ELECTRONICS CO., LTD., Suwon-si (KR)

(72) Inventors: Anirban Saha, Karnataka (IN); Balaji Somu Kandaswamy, Karnataka (IN); Raju Udava Siddappa, Karnataka (IN); Venkata Raju Indukuri, Karnataka (IN); Tushar Vrind, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 10 days.

(21) Appl. No.: 17/259,764

(22) PCT Filed: Aug. 26, 2019

(86) PCT No.: PCT/KR2019/010861
§ 371 (c)(1),
(2) Date: Jan. 12, 2021

(87) PCT Pub. No.: WO2020/045929
PCT Pub. Date: Mar. 5, 2020

(65) Prior Publication Data
US 2021/0263835 A1    Aug. 26, 2021

(30) Foreign Application Priority Data
Aug. 27, 2018 (IN) .............................. 201841032039

(51) Int. Cl.
G06F 9/44 (2018.01)
G06F 11/36 (2006.01)

(52) U.S. Cl.
CPC ...... *G06F 11/3644* (2013.01); *G06F 11/3636* (2013.01); *G06F 11/3676* (2013.01)

(58) Field of Classification Search
CPC ............. G06F 11/3644; G06F 11/3636; G06F 11/3676
See application file for complete search history.

(56) References Cited

U.S. PATENT DOCUMENTS 5,832,270 A * 11/1998 Laffra ................... G06F 11/323
717/125
8,745,595 B2    6/2014 Uno
(Continued)

FOREIGN PATENT DOCUMENTS

CN    101408862    4/2009
KR    1020180034473    4/2018

OTHER PUBLICATIONS

Chao Wang, "Dynamic Analysis and Debugging of Binary Code for Security Applications", Sep. 2013, Conference RV.
(Continued)

*Primary Examiner* — Hang Pan
(74) *Attorney, Agent, or Firm* — F. Chau & Associates, LLC

(57) ABSTRACT

A code coverage method for an embedded System on Chip (SoC) includes detecting a presence of a utility function in target source code; adding a hook function to the target source code; and recording at least one property of the utility function based on the hook function in a bit array in a memory of the SoC. The method may further include extracting at least one recorded property from bit arrays in the memory; and generating a code coverage report based on an analysis of the extracted properties.

20 Claims, 8 Drawing Sheets

(56) References Cited

U.S. PATENT DOCUMENTS

| | | | |
|---|---|---|---|
| 9,189,372 B2 | 11/2015 | Adler et al. | |
| 10,331,513 B2 | 6/2019 | Wenn | |
| 2007/0006168 A1* | 1/2007 | Dimpsey | G06F 11/3636 |
| | | | 717/130 |
| 2008/0172655 A1 | 7/2008 | Davia | |
| 2009/0313607 A1 | 12/2009 | Harding et al. | |
| 2011/0219454 A1 | 9/2011 | Lee et al. | |
| 2012/0167057 A1 | 6/2012 | Schmich et al. | |
| 2013/0117730 A1* | 5/2013 | Wisniewski | G06F 11/3664 |
| | | | 717/125 |
| 2015/0248343 A1* | 9/2015 | Ionescu | G06F 11/3688 |
| | | | 717/130 |
| 2015/0347263 A1* | 12/2015 | Chau | G06F 11/3644 |
| | | | 717/130 |
| 2018/0081782 A1 | 3/2018 | Fulton et al. | |
| 2020/0125477 A1* | 4/2020 | Batthish | G06F 11/3676 |

OTHER PUBLICATIONS

PCT International Search Report Date dated Dec. 27, 2019 in PCT/KR2019/010861.

\* cited by examiner

[Fig. 1]
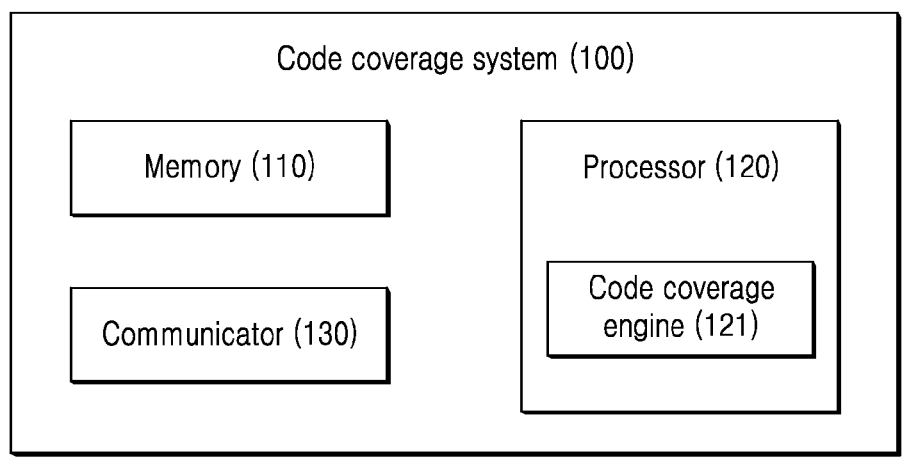

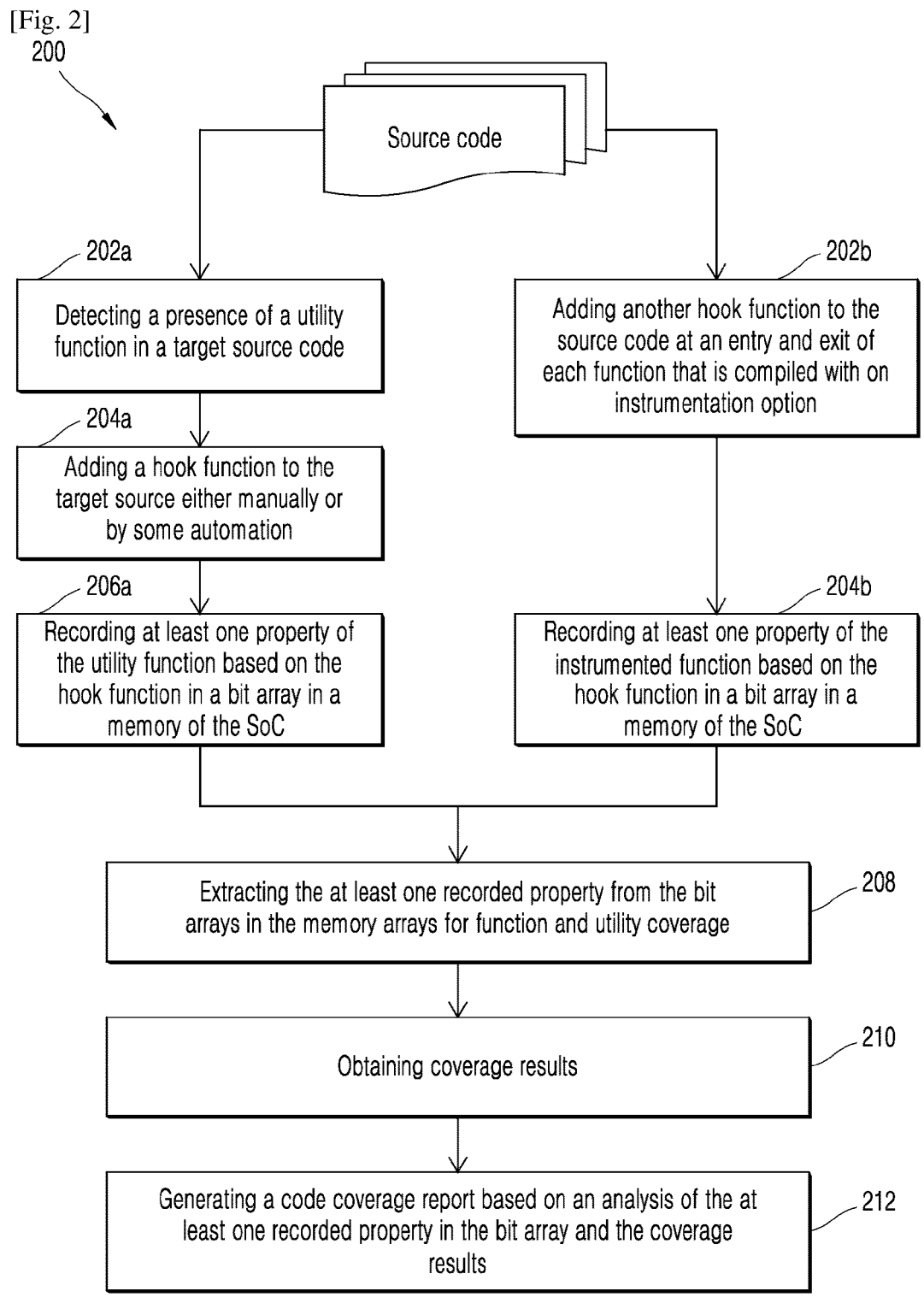

[Fig. 3]
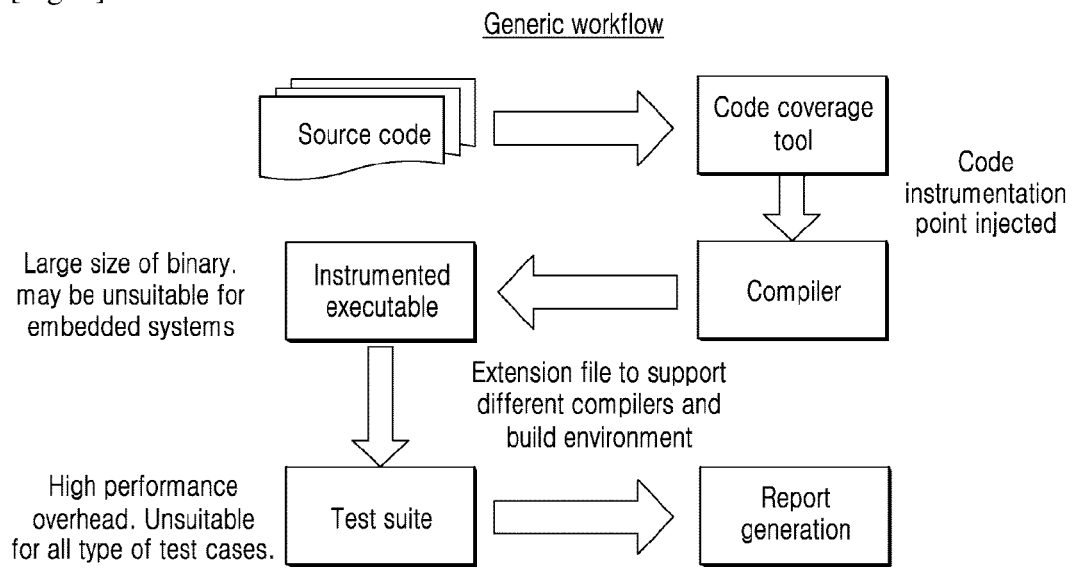
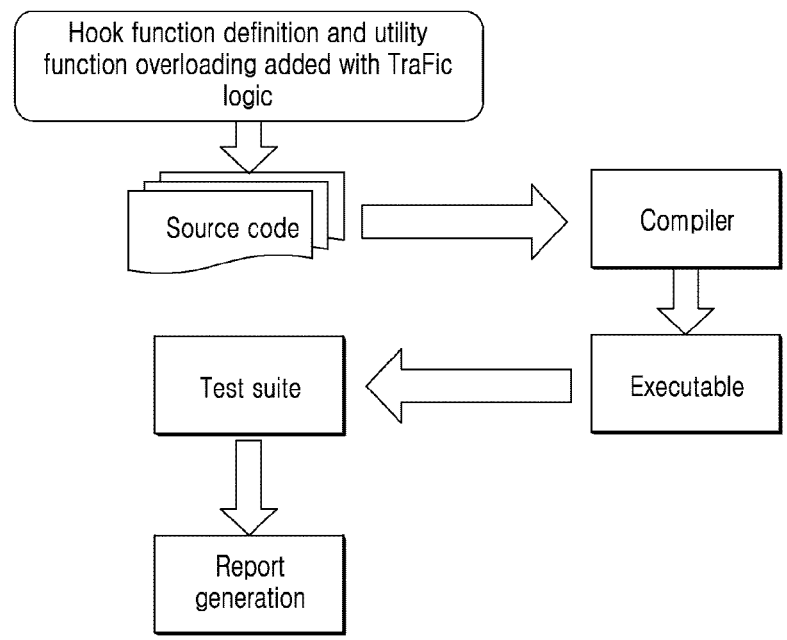

[Fig. 4A]
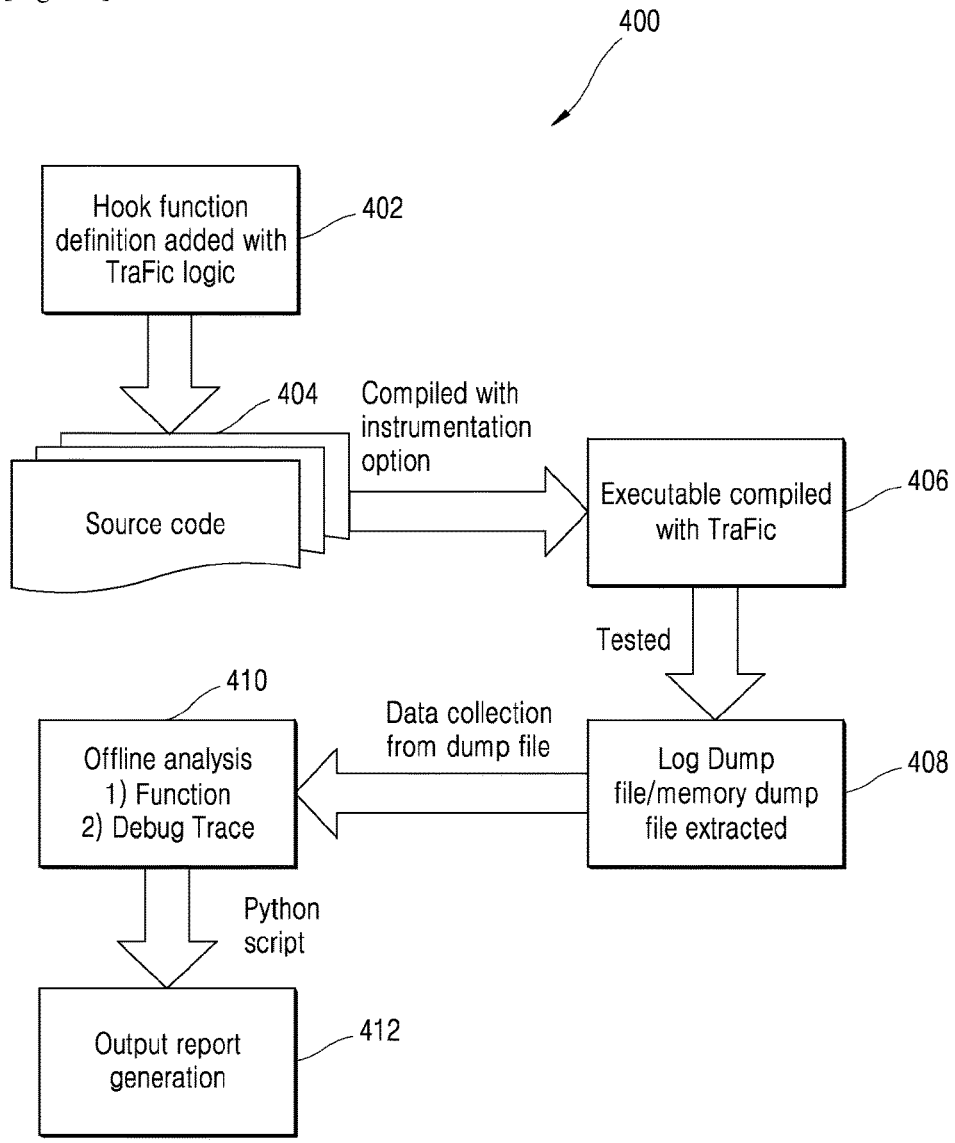
[Fig. 4B]
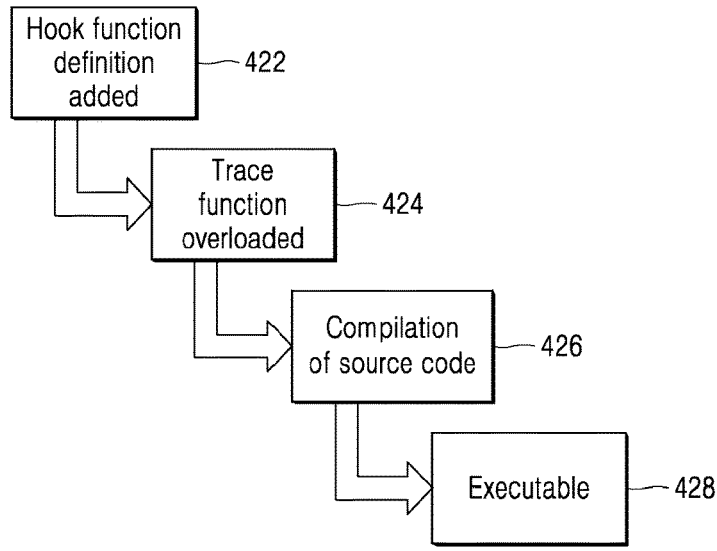

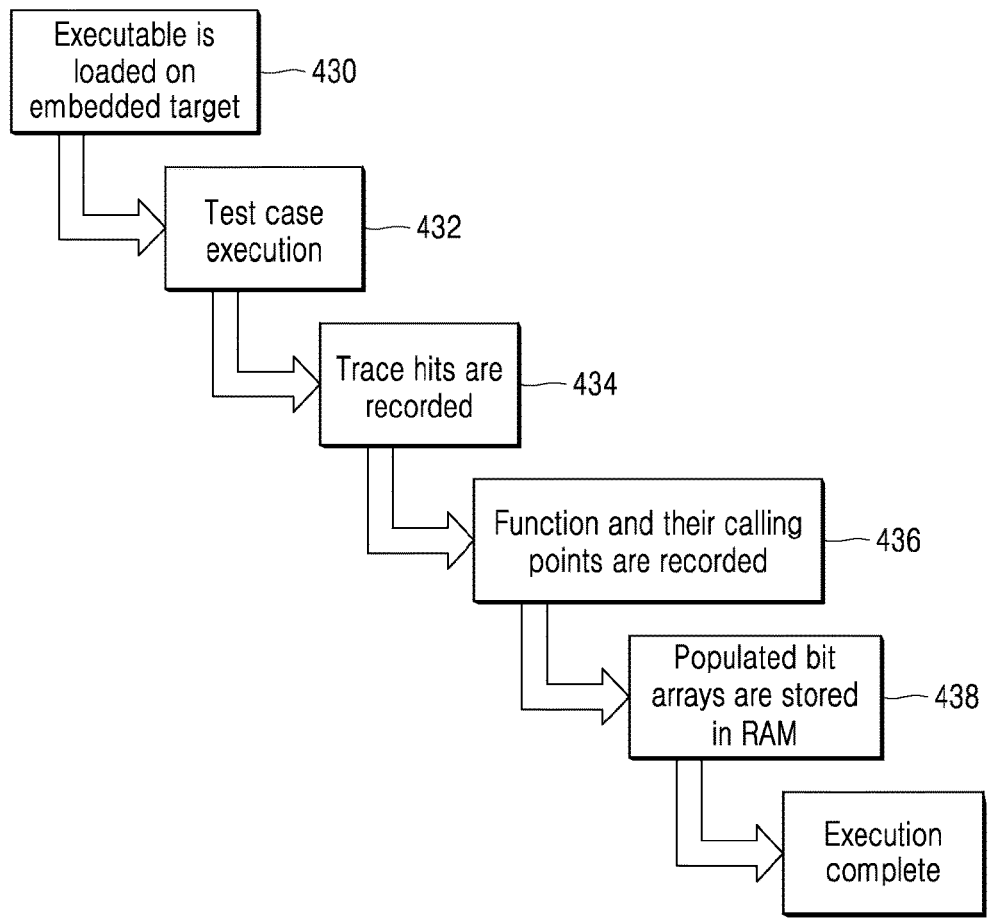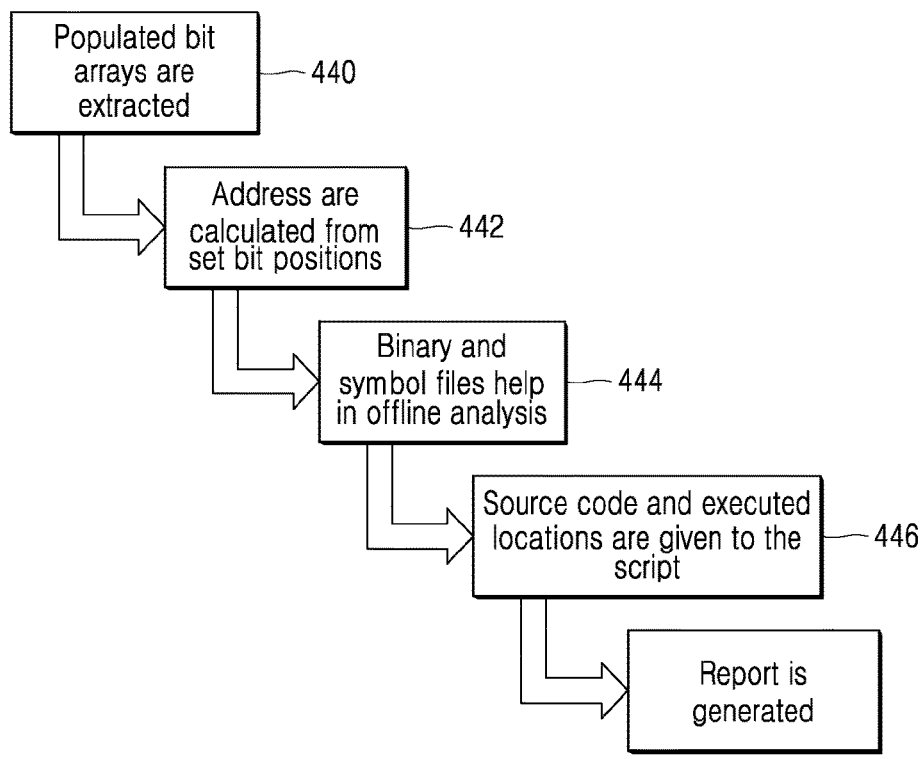

[Fig. 5]
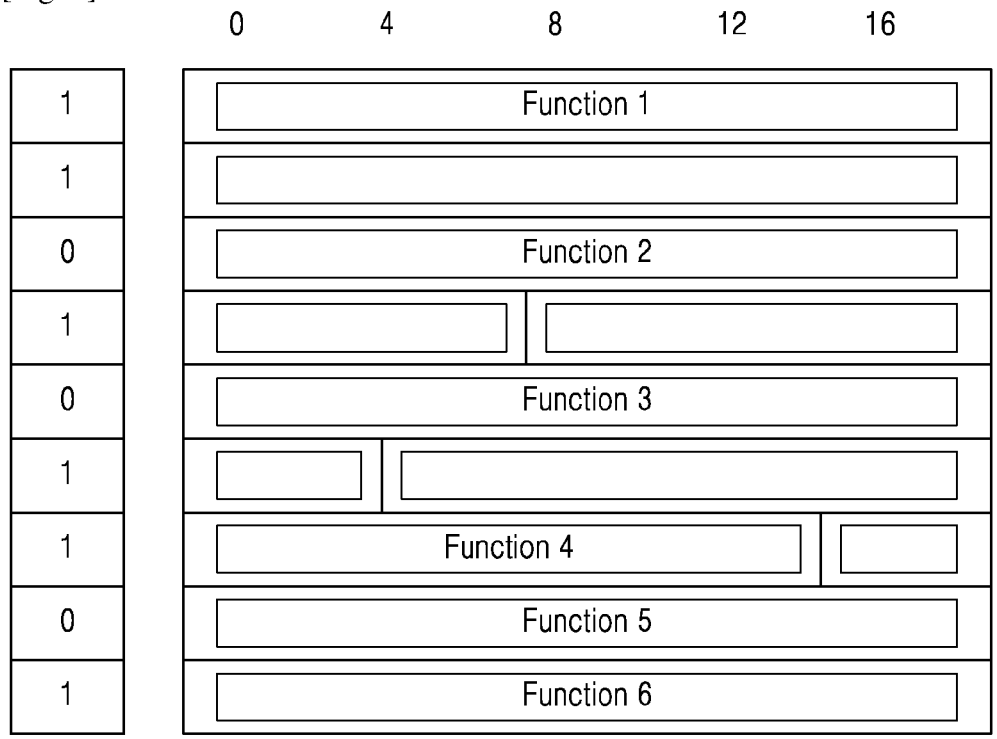
[Fig. 6]
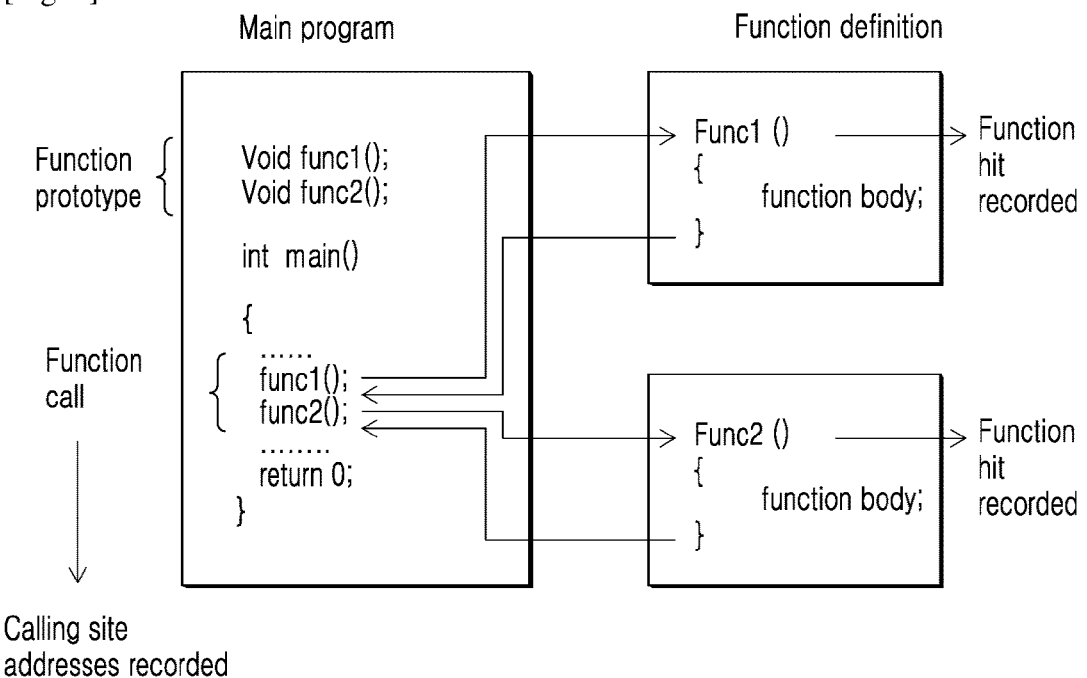

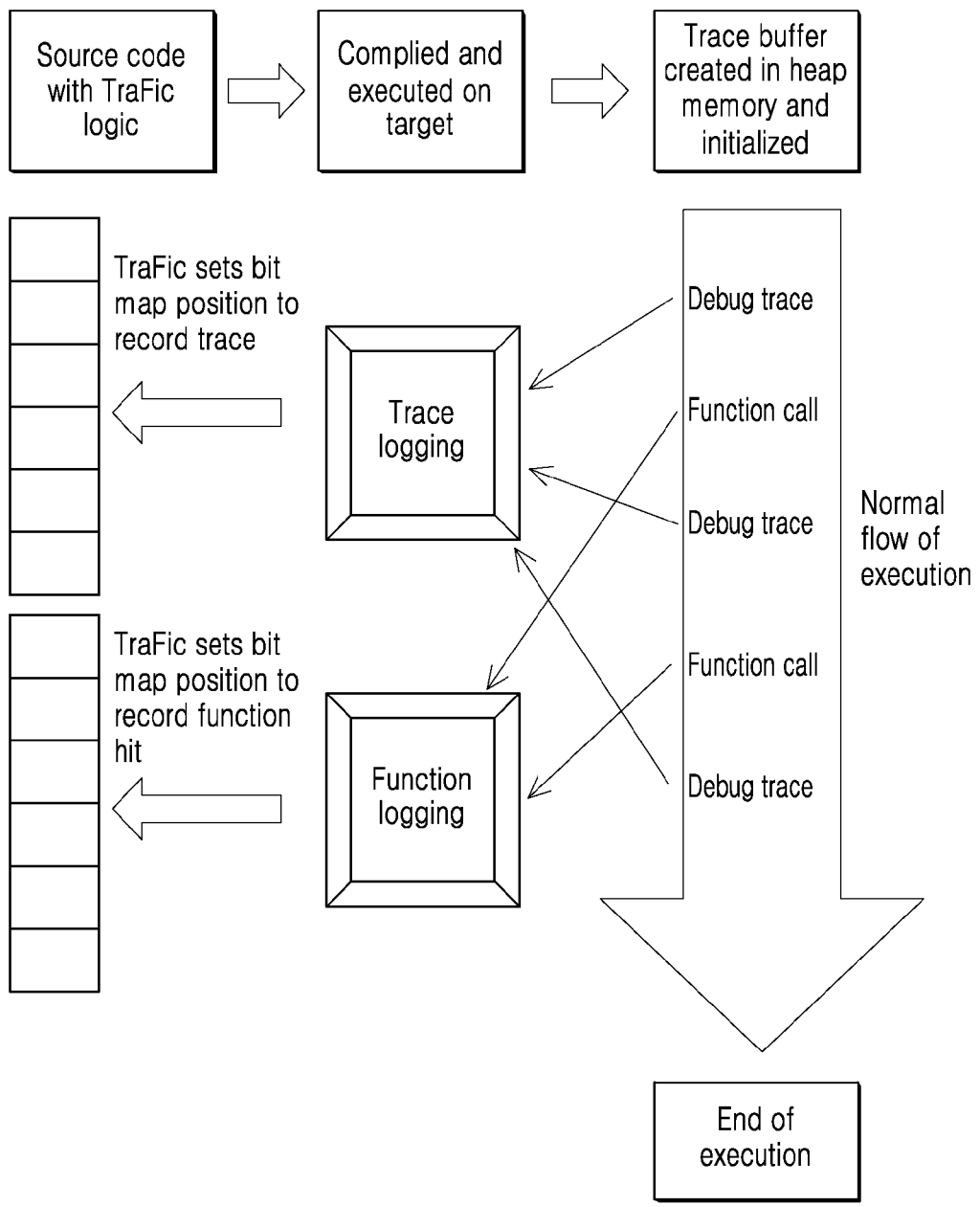
[Fig. 7]

[Fig. 8]
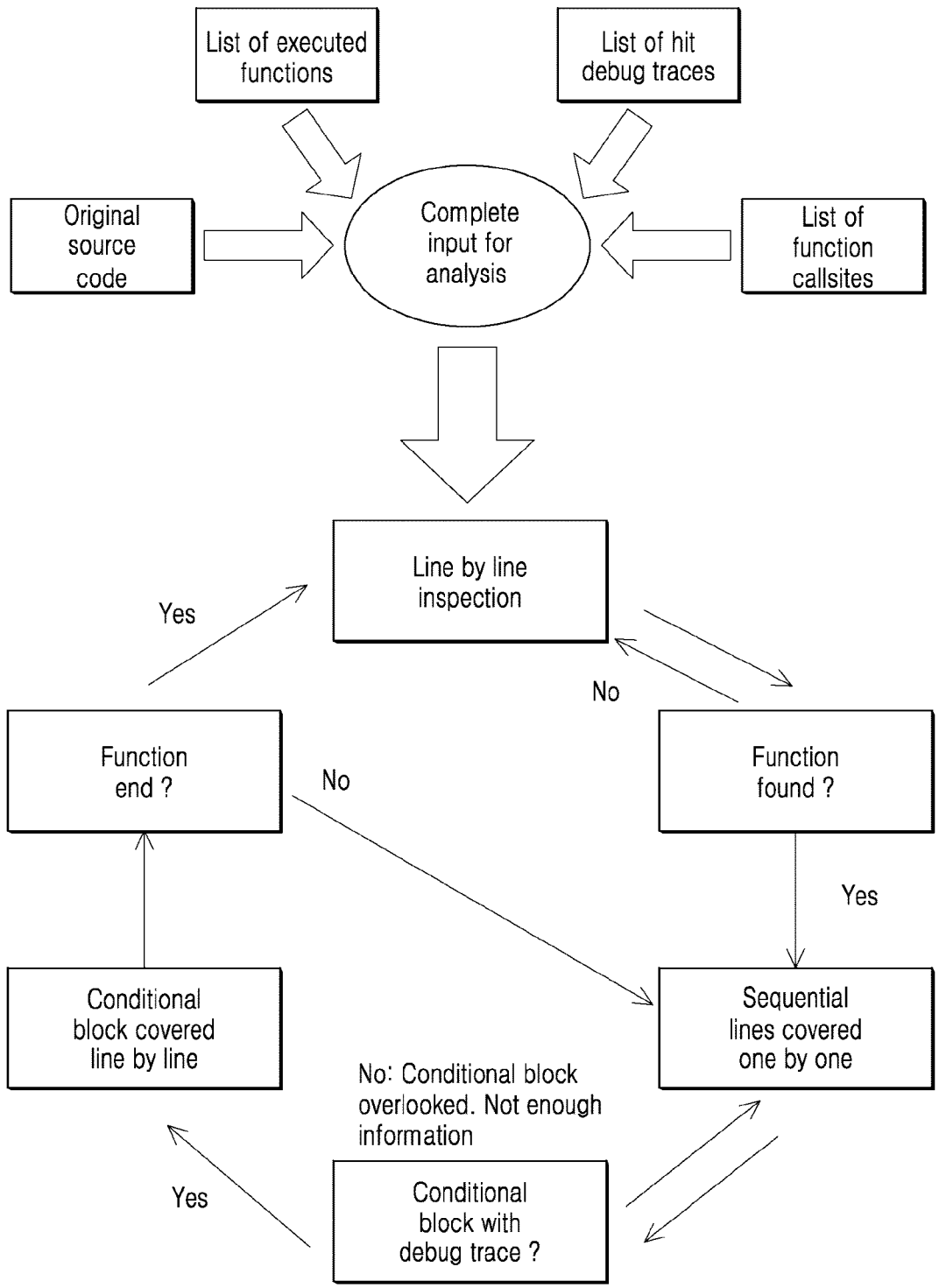

CODE COVERAGE METHOD FOR EMBEDDED SYSTEM ON CHIP

CROSS-REFERENCE TO RELATED APPLICATION

This U.S. non-provisional patent applications claims the benefit of priority to International Application No. PCT/KR2019/010861 filed on Aug. 26, 2019, which claims priority to Indian Patent Publication No. 2018/41032039 filed on Aug. 27, 2018.

BACKGROUND

1. Technical Field

The present disclosure relates to embedded systems, and more specifically relates to a code coverage method for an embedded system on chip.

2. Discussion of Related Art

Code coverage is a measure used to describe the degree to which source code of a program is executed through a test run. A program with higher coverage has more of its source code executed during testing, which suggests that it has a lower chance of containing an undetected error as compared to a program with lower coverage. Software reliability typically improves as testing coverage increases.

Addition of instrumentation hooks and data collection is a challenge for most code coverage tools but the biggest deterrent is an overhead imposed due to the instrumentation. In real-time systems, the addition of the instrumentation hooks and data collection can adversely affect the program execution and performance due to its strict requirement on timing and memory. In embedded systems with real-time computing constraints (limited memory and Central Processing Unit (CPU) resources), incorporating coverage hooks is complicated. Code coverage approaches can be broadly classified into three categories: Source code instrumentation, intermediate code instrumentation, and runtime information gathering.

Source code instrumentation adds instrumentation statements to the source code and compiles the code with a regular compiler to produce an instrumented assembly.

In intermediate code instrumentation, the compiled class files are instrumented by adding new bytecodes, and a new instrumented class is generated.

Runtime information gathering collects information from the runtime environment as the code executes to determine coverage information.

Most code coverage tools perform either the source code instrumentation (mostly used in C/C++ projects) or the intermediate code instrumentation (bytecode instrumentation in JAVA). These systems require adding separate libraries, buffer functions, conditional instrumentation lines, or additional parsers. In the case of JAVA, these systems require adding instrumentation to the bytecode which involves engineering and optimization efforts, adding to the development time as well as performance overhead.

Thus, there are several challenges with regard to conventional code coverage approaches.

SUMMARY

At least one embodiment of the inventive concept provides a code coverage method for an embedded system on chip (SoC).

At least one embodiment of the inventive concept is able to detect a presence of a utility function in a target source code.

At least one embodiment of the inventive concept is able to add a hook function to the target source code.

At least one embodiment of the inventive concept is able to record at least one property of the utility function based on the hook function in a bit array in a memory of the SoC.

At least one embodiment of the inventive concept is able to add another hook function based on an instrumentation option available at an entry and exit of any function that is compiled with that instrumentation option.

At least one embodiment of the inventive concept is able to record at least one property of an instrumented function based on the hook function in a bit array in a memory of the SoC.

At least one embodiment of the inventive concept is able to extract at least one recorded property from a bit array in the memory array for function and utility coverage.

At least one embodiment of the inventive concept is able to obtain coverage results.

At least one embodiment of the inventive concept is able to generate a code coverage report based on an analysis of the at least one recorded property in the bit array and the coverage results.

According to an exemplary embodiment of the inventive concept, a code coverage method for an embedded System on Chip (SoC) is provided. The method includes detecting a presence of a utility function target source code; adding a hook function to the target source code; and recording at least one property of the utility function based on the hook function in a bit array in a memory of the SoC.

The method may further include extracting at least one recorded property from bit arrays in the memory; and generating a code coverage report based on an analysis of the at least one recorded property in the bit arrays.

In an embodiment, the utility function is detected when the utility function meets a utility function threshold.

In an embodiment, the utility function is known prior or given as input. For example, common utility functions like a print function or a trace function in the implementation which is very frequently called in the implementation may be known prior.

In an embodiment, the hook function is added to the target source code either manually or automatically.

In an embodiment, prior to adding the hook function, the method includes enabling a user to select the detected utility function and the hook function is added manually to the target source code occurs upon the user manually selecting the detected utility function.

In an embodiment, the at least one property of the utility function comprises a location of the utility function, an execution status of the utility function, or function information of the utility function.

In an embodiment, size of the bit array is dependent on a number of utility functions supported by the code coverage system.

According to an exemplary embodiment of the inventive concept, a code coverage method for an embedded System on Chip (SoC) is provided. The method includes adding a hook function at an entry and exit of each function of target source code that is compiled with an instrumentation option; and recording at least one property of an instrumented function based on the hook function in a bit array in a memory of the SoC.

The method may further include extracting at least one recorded property from bit arrays in the memory; and generating a code coverage report based on an analysis of the at least one recorded property in the bit arrays.

In an embodiment, the hook function is added to the target source code automatically, wherein hook function is used to find coverage data.

In an embodiment, recording the at least one property of the instrumented function in the bit array using the hook function includes executing a hook function definition based on a coverage computational logic included in the hook function, and recording the at least one property at the entry and exit of the instrumented function based on the execution of the hook function definition.

In an embodiment, a size of the bit array is dependent on a number of functions supported by the code coverage system.

According to an exemplary embodiment of the inventive concept, an apparatus for executing a code coverage method in an embedded System on Chip (SoC) is provided. The apparatus includes a processor and a memory. The processor includes a code coverage engine configured to detect a presence of a utility function in target source code, add a hook function to the target source code, and record at least one property of the utility function based on the hook function in a bit array in a memory of the SoC.

The at least one property may include a location of the utility function within the target source code, an execution status of the utility function, or function information of the utility function.

The processor may be further configured to extract at least one recorded property from the bit arrays in the memory (e.g., in memory arrays) for function and utility coverage. Further, the processor may be configured to generate a code coverage report based on an analysis of the at least one recorded property in the bit arrays.

At least one embodiment of the inventive concept provides an apparatus for executing a code coverage method in an embedded System on Chip (SoC). The apparatus includes a processor and a memory. The processor is configured to add a hook function at an entry and exit of each function of target source code that is compiled with an instrumentation option. The processor is configured to record at least one property of the instrumented function based on the hook function in a bit array in a memory of the SoC.

The processor may be configured to extract at least one recorded property from bit arrays in the memory for function and utility coverage; and generate a code coverage report based on an analysis of the at least one recorded property in the bit arrays.

In an embodiment, the proposed code coverage tool called 'TraFic', which stands for Trace, Function and logical coverage is proposed to be adopted by either memory constrained embedded devices like Machine Type Communication (MTC) and Internet of Things (IoT) devices or by embedded cellular modem processors like 4G or 5G modems and can be applied in production releases as well. While the addition of instrumentation hooks and data gathering is challenging with most code coverage tools, the proposed method in the TraFic tool makes use of a novel method using system debug Log traces to inject instrumentation code and existing target platform compiler options, thereby decreasing the complexity of the mechanism and reducing memory requirements and performance overhead. Debug Log trace is an embodiment of a utility function. Also with the TraFic tool, code coverage can be used in field deployment to capture real-world scenarios and produce accurate results and aid system failure analysis, which adds great value to the product commercialization phase.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

Embodiments of the inventive concept will be more clearly understood from the following detailed description taken in conjunction with the accompanying drawings in which:

FIG. 1 illustrates a block diagram of a code coverage system for an embedded system on chip (SoC), according to an exemplary embodiment of the inventive concept;

FIG. 2 is a flow diagram illustrating a method for operating the code coverage system for the embedded SoC, according to an exemplary embodiment of the inventive concept;

FIG. 3 illustrates a difference between a generic workflow and a TraFic workflow of code coverage, according to an exemplary embodiment of the inventive concept;

FIG. 4A illustrates the workflow of the TraFic framework for code coverage, according to an exemplary embodiment of the inventive concept;

FIG. 4B, FIG. 4C, and FIG. 4D illustrates various mechanisms of sequential workflow of the TraFic framework, according to an exemplary embodiment of the inventive concept;

FIG. 5 illustrates a Bit Array corresponding to an address space, according to an exemplary embodiment of the inventive concept;

FIG. 6 illustrates a TraFic function coverage, according to an exemplary embodiment of the inventive concept;

FIG. 7 illustrates a Trace coverage at runtime, according to an exemplary embodiment of the inventive concept; and FIG. 8 is a flow diagram illustrating a method for performing a TraFic offline analysis, according to an exemplary embodiment of the inventive concept.

DETAILED DESCRIPTION OF THE EXEMPLARY EMBODIMENTS

The inventive concept and the various features and details thereof are explained more fully with reference to exemplary embodiments that are illustrated in the accompanying drawings and detailed in the following description. Descriptions of well-known components and processing techniques are omitted so as to not unnecessarily obscure the embodiments described herein. Also, the various embodiments described herein are not necessarily mutually exclusive, as some embodiments can be combined with one or more other embodiments to form new embodiments. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field of software, embodiments may be described and illustrated in terms of blocks, which carry out a described function or several functions. These blocks, which may be referred to herein as units or modules, may be physically implemented by analog or digital circuits such as logic gates, integrated circuits, microprocessors, microcontrollers, memory circuits, passive electronic components, active electronic components, optical components, hardwired circuits, and may optionally be driven by firmware and software. The circuits may, for example, be embodied in one or more semiconductor chips, or on substrate supports such as printed circuit boards. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concept. Likewise, the blocks of the embodiments may be physically combined into more complex blocks without departing from the scope of the inventive concept.

According to an exemplary embodiment of the inventive concept, a code coverage method for an embedded system on chip (SoC) is provided. The method includes detecting a presence of a utility function in a target source code. In an embodiment, the detecting is performed by parsing the target source code for text representing the name of the utility function and one or more delimiters that are adjacent the name (e.g., '(', "( )", "( );", etc.). The utility function may be known prior or provided as an input. Examples of the utility function may include a print function, a trace function, or any other function that is known to be frequently called. In an embodiment, the utility function is detected when the utility function meets a utility function threshold. For example, the utility function threshold could include various factors such as the number of parameters received, the number of lines of code, a certain minimal set of operators, a certain loop complexity, a certain function name, etc. Further, the method includes adding a hook function to the target source code. Further, the method includes recording at least one property of the utility function based on the hook function in a bit array in a memory of the SoC. Examples of the at least one property include a location of the utility function within the source code, an execution status of the utility function (e.g., executed, not executed, etc.), and function information of the utility function (e.g., values of variables within the function). In an exemplary embodiment, execution of the utility function causes execution of the hook function, and execution of the hook function causes the recording to be performed. For example, the hook function may include one or more instructions that query a variable within the utility function to determine the at least one property. For example, if the variable has a first state initially and the variable changes to a second other state when the utility function is executed, the property could be set to indicate that the utility function has been executed when the variable has the second state. In an exemplary embodiment, the hook function includes one or more instructions that performs a query to determine the name of the utility function or an identifier (e.g., a number) that uniquely identifies the utility function, and this name or identifier is a property of the at least one property. For example, the at least one property could identify the utility function and indicate whether the utility function was executed. Further, the method includes extracting at least one recorded property from the bit arrays in the memory for determining function and utility coverage. Further, the method includes obtaining coverage results. Further, the method includes generating a code coverage report based on an analysis of the at least one recorded property in the bit arrays and the coverage results. For example, the report may indicate whether each function among the functions being profiled (i.e., those that include hook functions) within the source code has been executed, how much of the source code was executed (e.g., 80%, 90%, etc.), or how many of the profiled functions were executed.

FIG. 1 illustrates a block diagram of a code coverage system 100 for an embedded system on chip (SoC), according to an exemplary embodiment of the inventive concept. In an embodiment, the code coverage system 100 includes a memory 110, a processor 120, and a communicator 130.

The memory 110 stores instructions to be executed by the processor 120. The memory 110 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 110 may, in some examples, be considered a non-transitory storage medium. The term "non-transitory" may indicate that the storage medium is not embodied in a carrier wave or a propagated signal. However, the term "non-transitory" should not be interpreted to indicate that the memory 110 is non-movable. In some examples, the memory 110 can be configured to store larger amounts of information. In certain examples, the non-transitory storage medium stores data that can, over time, change (e.g., in Random Access Memory (RAM) or cache). While the memory 110 is depicted in FIG. 1 as an internal storage unit of the code coverage system 100, the inventive concept is not limited thereto. For example, the memory 110 can be implemented as an external storage unit of the code coverage system 100 such as cloud storage, or any other type of external storage.

The processor 120 communicates with the memory 110 and the communicator 130. The processor 120 is configured to execute instructions stored in the memory 110 and to perform various processes. The processor 120 includes a code coverage engine 121.

In an embodiment, the code coverage engine 121 is configured to detect a presence of a utility function in a target source code and add a utility hook function to the target source code either manually or by some automation. For example, the code coverage engine 121 could present a graphical list to a user that lists all of the detected utility functions, where a user is expected to manually select the items of the list representing the detected utility functions the user wants profiled, and then the code coverage engine 121 automatically adds a hook function to each of the selected utility functions. For example, the code coverage engine 121 could instead automatically insert a hook function into each detected utility function without seeking feedback from the user. Further, the code coverage engine 121 is configured to record at least one property of the utility function based on the hook function in a bit array in a memory of the SoC. For example, the code coverage engine 121 may store the at least one property in a bit array in memory 110. Further, the code coverage engine 121 may be configured to extract at least one recorded property from the bit arrays in the memory for function and utility coverage. Further, the code coverage engine 121 may be configured to obtain coverage results. Further, the code coverage engine 121 may be configured to generate a code coverage report based on an analysis of the at least one recorded property in the bit arrays and the coverage results.

In an embodiment, the code coverage engine 121 is configured to add another separate hook function based on an instrumentation option available at an entry and exit of any function. For example, the separate hook function may be added at an entry of each function within the source code and at an exit of each function. For example, the instrumentation option (e.g., -add-hook) can be input to a compiler (e.g., armcc source-code-add-hook) as a parameter when directing the compiler to compile the source code. Further, the code coverage engine 121 may be configured to record at least one property of an instrumented function based on the hook function in a bit array in a memory of the SoC. Further, the code coverage engine 121 may be configured to extract at least one recorded property from the bit arrays in memory for function and utility coverage. Further, the code coverage engine 121 may be configured to obtain coverage results. Further, the code coverage engine 121 may be configured to generate a code coverage report based on an analysis of the at least one recorded property in the bit array and the coverage results.

The communicator 130 is configured for communicating internally between internal hardware components and with external devices via one or more networks. For example, the communicator 130 may be implemented by a transceiver including a transmitter capable of transmitting data wirelessly across one or more of the networks and a receiver capable of receiving data wirelessly from one or more of the networks. The processor 120 may be use the communicator 130 to transmit the coverage results or the code coverage report to a remote device that is capable of receiving data from one of the networks.

Although FIG. 1 shows various hardware components of the code coverage system 100 it is to be understood that other embodiments are not limited thereto. In other embodiments, the code coverage system 100 may include less components or more components. Further, the labels or names of the components are used only for illustrative purpose and does not limit the scope of the inventive concept. One or more of the components can be combined together to perform the same or a substantially similar function for the code coverage method for the embedded SoC.

FIG. 2 is a flow diagram 200 illustrating a method for operating the code coverage system 100 for an embedded SoC, according to an exemplary embodiment of the inventive concept. The operations (202a-212) and (202b-212) may be performed by the code coverage engine 121.

At block 202a, the method includes detecting a presence of a utility function in a target source code. At block 204a, the method includes adding a hook function to the target source code either manually or by some automation. At block 206a, the method includes recording at least one property of the utility function based on the hook function in a bit array in a memory of the SoC.

At block 202b, the method includes adding another hook function to the source code at an entry and exit of each function that is compiled with that instrumentation option. At block 204b, the method includes recording at least one property of the instrumented function based on the hook function in a bit array in a memory of the SoC. In an exemplary embodiment, blocks 202b and 204b are omitted. In another exemplary embodiment, blocks 202a, 204a, and 206a are omitted.

At block 208, the method includes extracting the at least one recorded property from the bit array in the memory arrays for function and utility coverage. At block 210, the method includes obtaining coverage results. At block 212, the method includes generating a code coverage report based on an analysis of the at least one recorded property in the bit array and the coverage results.

FIG. 3 illustrates a difference between a generic workflow and a TraFic workflow of code coverage, according to an exemplary embodiment of the inventive concept. A TraFic refers to Trace, Functional and Logical coverage which presents a low cost, low engineering and low overhead system to capture code coverage by making use of existing target platform build options and a method of using system debug traces additionally with the TraFic offline logic to derive coverage data. The proposed method decreases the overall complexity of instrumenting the code and the TraFic offline analysis results in saving CPU processing time and reducing memory requirements. Table. 1 provides a comparative report of the feature differences between the TraFic and other coverage tools for generic platforms.

TABLE 1

Comparison report of coverage tools

| Feature | TraFic | Generic tools |
|---|---|---|
| Function coverage | Yes | Yes |
| Statement coverage | Yes | Yes |
| Decision coverage | Dependent on trace logging | Yes |
| Modified condition/ decision coverage | No | Possible |
| Requires specialized runtime | No | Yes |
| Code size increase | Small | Large |
| Runtime performance impact | Negligible | Variable (may be high) |
| Control over entities reported | Limited | Possibly more |
| Complexity of setup | Very little | Complicated |
| Field testing | Yes | No |

FIG. 4A illustrates a workflow 400 of the TraFic framework for code coverage, according to an exemplary embodiment of the inventive concept. The code coverage (TraFic) tool, the TraFic at its core is an amalgamation of three types of coverage: 1) function coverage, 2) trace coverage, and 3) offline (logical) coverage. The data collected from these procedures may provide the basis for the final coverage report. Execution of the TraFic can be divided into three distinct stages: code instrumentation, data collection, and offline parsing and report generation.

At blocks 402-406 code instrumentation, compiler aided instrumentation is achieved by using a target platform compiler option. In the case of the ARM-based platform, this can be achieved using 'armcc' compiler option called gnu instrument. Using this, profiling the hook functions are called after function entry and before function exit, with the address of the current function and its call site: i) void_cyg_profile_ func_enter(void*current_func,void*callsite) and ii) void_cyg_profile_func_exit(void*current_func, void*callsite). The call site of a function may be the location (line of code) where the function is called. Similarly, in the case of the host-based platform, this can be achieved using a Microsoft Visual C++ (MSVC) compiler option called /Gh which enables the 'penter' Hook Function.

At block 408 data collection, the workflow 400 uses existing system debug log traces for the trace coverage and function instrumentation hooks for functional coverage at runtime to collect code coverage metrics. Due to constrained memory usage in the embedded system, the logic implemented is preferably designed to be as succinct and accurate as possible.

At blocks 410-412 offline parsing and report generation, the data that is collected in the second phase (i.e. 408) is taken as input and parsed to create the coverage report. In an embodiment, the TraFic creates hierarchical, color-coded, HTML-supported coverage reports. FIG. 4B, FIG. 4C, and FIG. 4D shows the complete workflow of the TraFic for a basic overview.

The TraFic makes use of the existing features and similar environmental build options present in the target platform so that each stage becomes inherently platform independent and the same solution can be implemented for any embedded software. In an embodiment, TraFic records only the coverage information and not the entire execution trace, which minimizes the system overhead.

FIG. 4B, FIG. 4C, and FIG. 4D illustrates various mechanisms of sequential workflow of the TraFic framework, according to an exemplary embodiment of the inventive concept. FIG. 4B illustrates the step by step procedure of the TraFic during preprocessing. For example, the procedure of FIG. 4B includes adding hook function definition (step 422), overloading trace function (step 424), and compiling source code (step 426) to generate executable 428. FIG. 4C illustrates the step by step procedure of the TraFic during execution. For example, the procedure of FIG. 4C includes loading executable 428 on embedded SoC (step 430), executing the executable 428 (step 432), recording trace hits (step 434), recording functions executed and their calling points (step 436) in bit arrays, and storing bit arrays in memory (step 438) to complete execution. FIG. 4D illustrates the step by step procedure of the TraFic during post preprocessing. For example, the procedure of FIG. 4D includes extracting the bit arrays (step 440), calculating function addresses from set bit positions in the bit arrays (step 442), using binary and symbol files help in offline analysis (step 444), and giving source code and executed locations to script (step 446) to generate report.

FIG. 5 illustrates a Bit Array corresponding to the address space, according to an exemplary embodiment of the inventive concept. The TraFic function coverage provides the information on all functions and subroutines called and their calling sites during the course of execution. During the first phase (i.e. 402-406) of the TraFic, the definition of an entry hook function is added to the target source code along with coverage computational logic. Once the target source code is compiled with the instrumentation option available with the compiler, a hook call is added automatically at the entry and exit of every function. The compiler also provides an option to disable the hook calls for specific functions for the developer to use. For every normal function that is executed, the entry hook function gets called and the executed function and its calling site gets recorded as part of the TraFic. Since compilation is necessary for automatic instrumentation, portions of code which are already compiled (libraries) are beyond the reach of the TraFic. As part of the computational logic, two global bit arrays are used in the target main memory. One where the function hits are recorded, one bit per function and the second one which records the addresses from where the functions are called. For example, a function hit occurs when a normal function is executed.

For recording function hits, considering the smallest size of a function in a system to be 4 bytes, then the addition of instrumentation calls by the compiler (armcc) adds an additional 16 bytes to make the total size of the function to be 20 bytes. As each function having a minimum 20 bytes can be represented by a bit, a 6554-byte array (52432 bits) can cover a code segment of size 1 MB (1024*1024 bytes). If the minimum function size increases, the bit array size will decrease at a commensurate degree, and hence a large code size can be addressed. In an embodiment, the entry hook function provides the function address as a parameter which forms the basis for the bit location for that function. The difference of code segment base address and the function address provides an offset which is divided by a minimum function size cutoff (e.g., 20 bytes) to derive the bit location for the particular function which can be set to indicate that the function is hit (e.g., executed) during runtime. Calculating the offset from the code segment base address reduces the 32-bit function address into a smaller manageable value. This offset effectively represents the location of the function as if the segment had started at address 0. The minimum function size (e.g., 20 bytes) is effectively utilized to reduce this offset value to a bit location where every bit represents a 20-byte region. FIG. 5 provides an accurate depiction of the bit array mapping. The whole operation for the TraFic function coverage uses minimal extra instructions due to the TraFic computational logic.

FIG. 6 illustrates the TraFic function coverage, according to an exemplary embodiment of the inventive concept. Recording function calling sites provide much more information as opposed to simply tagging function hits. The same function can be called multiple times and from multiple points in the code. Recording this varied and changing calling positions provide a lot of information, which aid in the TraFic offline analysis. There is no instrumentation done apart from the similar bit array logic to record addresses. The size of the bit array depends on the alignment and padding of source code. A 1 MB code segment size may require 32768 bytes keeping under consideration that every piece of instruction in this code segment may be a function call. The TraFic coverage may use a similar address space to bit position mapping logic to record data. FIG. 6 provides an accurate representation of the TraFic function coverage.

After execution of a test suite (e.g., one or more test cases that are intended to be used to test a software program), the populated global bit maps are extracted from the memory dump and checked to see which positions are set. The symbol file generated during compilation is used for the TraFic offline debugging process. Symbol files are created when images are compiled and are used for debugging an image. The symbol file contains the function names and their starting addresses. By cross-referencing these addresses with the set bit positions, the list of functions that were executed is derived. Similarly using the symbol file, the calling site addresses are back traced to their source file and line. It should be noted that the bit array is used to represent the function that was executed and not used to record the number of times the function was executed. This was done due to the necessity of keeping a minimal memory footprint.

FIG. 7 illustrates the Trace coverage at runtime, according to an exemplary embodiment of the inventive concept. Trace coverage covered by the TraFic is an embodiment of the utility function. Tracing involves a specialized use of logging to record information about a program's execution. It provides developers with information useful for debugging. The program's execution information may be used both during development cycles and sometimes after the release of the software as well. While tracing can be achieved by outputting to a debugger, in embedded systems, the use of trace logs are much more common. The log traces may be kept in most of the functions by developers to help with a multitude of debug data for software issue analysis. The TraFic may use these existing debug traces as instrumentation points. If a trace is logged, then the TraFic records that position and uses it as information during the TraFic offline analysis for code coverage.

In embedded systems, Trace Macros may be implemented as preprocessor macros that are mapped to a specific function where the trace is logged. Each log trace expands to a data descriptor containing information about the trace logs as per the developer's usage. It also provides an exact location of the trace log and as such contains additional details like source file, line number, etc. These Traces are like every other data structure, they form a part of the memory layout of the final executable image (Trace segment). In an embodiment, this trace logging mechanism is overloaded by the TraFic to obtain the data structures' addresses and recorded in a bit array similar to the TraFic function coverage where each bit corresponds to one trace descriptor. Even if Log traces are functionally disabled (compiled but with trace level disabled in final execution), the TraFic's method of the trace coverage still works since it does not rely on the actual debug traces collected. The bit array is populated at run time by the computational logic irrespective of whether the actual trace statements are being utilized.

The size of the bit array is dependent on the size of the trace data structure (e.g., inversely proportional). For example, if the trace structure has a size of 28 bytes, then 1 MB (1024*1024 bytes) of the trace segment can be sufficiently covered by 4682 bytes (37456-bit array). Since not all trace logging is always enabled, the trace segment size varies in size. As such, the TraFic has a trace buffer initialization function which reads the size of the Trace segment at runtime and dynamically allocates the required number of bits from heap memory. FIG. 7 shows an exemplary flow of execution at runtime that occurs for the trace coverage. The bit setting operation for the trace coverage is exactly the same as the TraFic function coverage. The trace data structure address is subtracted from the trace segment base address, the size of the trace descriptor is then used for division and the bit corresponding to that is set.

Similar to the TraFic function coverage, every debug trace logging by the TraFic requires minimal extra statements which are negligible in terms of overhead. After execution, this populated bit map is extracted from the memory dump and is checked to identify set positions. The binary file generated during compilation has the trace data structures in the trace segment, which is used for the TraFic offline analysis. Based on the calculated trace addresses pointing to these data structures, the TraFic accesses these offline using a script, thereby determining the actual source code file name and line number in detail.

FIG. 8 is a flow diagram illustrating a method for the TraFic offline analysis, according to an exemplary embodiment of the inventive concept. In the TraFic offline (logical) analysis, the memory dump collected after the execution of a test suite is used to extract the bit arrays for function coverage and trace coverage. Additionally, some more coverage results may be obtained by following a logical execution of the TraFic offline analysis using a script. This is achieved by stepping the source code directly based on a list of executed functions, function calling locations and trace logs. Additional logic may be added to find the source lines, which are not compiled. Any compiled line inside an executed function is assumed to be hit unless it is conditional. For conditional blocks, a search is performed for the presence of debug trace logs inside or for function calls. As the TraFic does not instrument line by line inspection or even conditional branches, it is dependent on the presence of Trace macros or any function call at these locations to effectively cover them. If the proposed method finds any executed addresses using the recorded list, the proposed method can treat that conditional block as a sequential step.

At least one embodiment of the inventive concept disclosed herein can be implemented using at least one software program running on at least one hardware device and performing network management functions to control the elements.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the disclosure.

What is claimed:

1. A code coverage method for an embedded System on Chip (SoC), comprising:
   detecting, by a code coverage system, a presence of a utility function in target source code;
   adding, by the code coverage system, a hook function to the utility function, wherein execution of the hook function causes a property of the utility function to be determined and provides a function address of the utility function;
   determining, by the code coverage system, a location of a given bit within a bit array in a memory of the SoC associated with the utility function by subtracting the function address from a code segment base address to generate an offset and dividing the offset by a minimum function size; and
   recording, by the code coverage system, whether the utility function has been executed in the given bit having the determined location from an analysis of the property.

2. The method of claim 1, wherein the utility function is detected when the utility function meets a utility function threshold.

3. The method of claim 1, wherein the adding of the hook function to the target source code is performed automatically.

4. The method of claim 1, wherein prior to the adding, the method includes enabling a user to select the detected utility function and the adding of the hook function to the utility function occurs upon the user manually selecting the detected utility function.

5. The method of claim 1, wherein the property of the utility function comprises a location of the utility function within the target source code.

6. The method of claim 1, wherein the property of the utility function comprises an execution status of the utility function.

7. The method of claim 1, wherein the property of the utility function comprises function information of the utility function.

8. The method of claim 1, wherein a size of the bit array is dependent on a number of the utility functions supported by the code coverage system.

9. The method of claim 1, further comprising:
   extracting, by the code coverage system, at least one recorded property from the bit array in the memory; and generating, by the code coverage system, a code coverage report based on an analysis of the at least one recorded property in the bit array.

10. A code coverage method for an embedded System on Chip (SoC), comprising:
adding, by a code coverage system of the SoC, a hook function at an entry and exit of each utility function of target source code that is compiled with an instrumentation option, wherein execution of the hook function provides a function address, execution of the hook function at the entry of corresponding utility function determines a value of a variable at the entry and execution of the hook function at the exit of the corresponding utility function determines a value of the variable at the exit;
determining, by the code coverage system, for each utility function, a location of a given bit within a bit array in a memory of the SoC by subtracting the corresponding function address from a code segment base address to generate an offset and dividing the offset by a minimum function size;
recording, by the code coverage system, for each executed hook function whether the corresponding utility function has been executed in a corresponding given bit having the determined location from an analysis of the values of the corresponding variable.

11. The method of claim 10, wherein the adding of the hook function to the target source code is performed automatically, wherein the hook function is used to find coverage data.

12. The method of claim 10, wherein a size of the bit array is dependent on a number of functions supported by the code coverage system.

13. The method of claim 10, further comprising:
extracting, by the code coverage system, at least one recorded property from the bit array in the memory; and
generating, by the code coverage system, a code coverage report based on an analysis of the at least one recorded property in the bit array.

14. The code coverage method of claim 10, wherein the corresponding utility function has been executed when the analysis of the values indicates a state of the corresponding variable has changed and not been executed when the analysis indicates the state has not changed.

15. An apparatus for executing a code coverage method in an embedded System on Chip (SoC), comprising:
a memory; and
a processor including a code coverage engine configured to detect a presence of a utility function in target source code, add a hook function to the utility function such that execution of the hook function causes a property of the utility function to be determined and provides a function address of the utility function, determine a location of a given bit within a bit array in the memory associated with the utility function by subtracting the function address from a code segment base address to generate an offset and dividing the offset by a minimum function size, and record whether the utility function has been executed in the given bit having the determined location from an analysis of the property.

16. The apparatus of claim 15, wherein the property is a location of the utility function within the target source code.

17. The apparatus of claim 15, wherein the property is an execution status of the utility function.

18. The apparatus of claim 15, wherein the property is function information of the utility function.

19. The apparatus of claim 15, wherein a size of the bit array is dependent on a number of utility functions supported by the code coverage engine.

20. The apparatus of claim 15, wherein the code coverage engine is configured to extract at least one recorded property from the bit array in the memory and generate a code coverage report based on an analysis of the extracted properties.

* * * * *